(12) United States Patent
Imai et al.

(10) Patent No.: US 10,574,506 B2
(45) Date of Patent: Feb. 25, 2020

(54) COMMUNICATION CONFIGURATION DEVICE

(71) Applicant: TAIYO YUDEN CO., LTD., Tokyo (JP)

(72) Inventors: Yoji Imai, Tokyo (JP); Kazuo Asanuma, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 110 days.

(21) Appl. No.: 15/866,925

(22) Filed: Jan. 10, 2018

(65) Prior Publication Data
US 2018/0198674 A1 Jul. 12, 2018

(30) Foreign Application Priority Data

Jan. 11, 2017 (JP) ................................. 2017-002805

(51) Int. Cl.
*G06F 13/00* (2006.01)
*H04L 29/08* (2006.01)
*H04B 1/713* (2011.01)
*H04L 29/06* (2006.01)
*H04L 5/00* (2006.01)

(52) U.S. Cl.
CPC ....... *H04L 29/08981* (2013.01); *H04B 1/713* (2013.01); *H04L 5/0012* (2013.01); *H04L 63/104* (2013.01); *H04L 67/32* (2013.01)

(58) Field of Classification Search
CPC . H04L 29/08981; H04L 63/104; H04L 67/32; H04L 67/34; H04L 5/0012; H04W 4/50; H04W 8/245; H04B 1/713

USPC .................................. 709/220–222, 227–229
See application file for complete search history.

(56) References Cited

U.S. PATENT DOCUMENTS

| | | | | |
|---|---|---|---|---|
| 7,672,278 | B2 * | 3/2010 | Gassho | H04L 12/5692 370/338 |
| 2003/0100335 | A1 * | 5/2003 | Gassho | H04L 12/5692 455/552.1 |
| 2016/0142292 | A1 * | 5/2016 | Au | H04L 5/0007 370/352 |

FOREIGN PATENT DOCUMENTS

JP 2008-228191 A 9/2008

* cited by examiner

*Primary Examiner* — Kenneth R Coulter
(74) *Attorney, Agent, or Firm* — Chen Yoshimura LLP

(57) ABSTRACT

A communication configuration device installed in at least one of a plurality of communication terminals that are designed to be connected in a manner to establish a wireless network includes one or more processors receiving, through a network interface, setting information providing communication settings for all of the plurality of communication terminals; evaluating the second setting information; and if the setting information indicates that one or more of the settings of the communication terminal in which the communication configuration device is installed need to be changed, causing a corresponding setting in the original setting information stored in a storage unit to be replaced with an updated setting indicated in the setting information so that the updated setting is applied to said communication terminal.

20 Claims, 4 Drawing Sheets

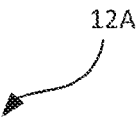

| Parent ID | Child ID | Frequency Information | Address Information | Positional Information | Mode Information |
|---|---|---|---|---|---|
| Parent Device 110 | Child Device 121 | 2 | F0-92-1C-E4-5C-33 | 110-121 | Normal Operation Mode |
| | Child Device 121A | 2 | F0-92-1C-E4-5C-44 | 110-121A | Normal Operation Mode |
| | Child Device 121B | 2 | F0-92-1C-E4-5C-55 | 110-121B | Scanning Mode |
| | Child Device 122 | 2 | F0-92-1C-E4-5C-66 | 110-122 | Normal Operation Mode |
| | Child Device 122A | 2 | F0-92-1C-E4-5C-77 | 110-122A | Normal Operation Mode |
| | Child Device 122B | 2 | F0-92-1C-E4-5C-88 | 110-122B | Normal Operation Mode |
| Parent Device 210 | Child Device 221 | 7 | F0-92-1C-E4-5C-99 | 210-221 | Normal Operation Mode |
| | Child Device 221A | 7 | F0-92-1C-E4-5C-AA | 210-221A | Normal Operation Mode |
| | Child Device 221B | 7 | F0-92-1C-E4-5C-BB | 210-221B | Configuration Mode |
| | Child Device 222 | 7 | F0-92-1C-E4-5C-CC | 201-222 | Normal Operation Mode |
| | Child Device 222A | 7 | F0-92-1C-E4-5C-DD | 210-222A | Normal Operation Mode |
| | Child Device 222B | 7 | F0-92-1C-E4-5C-EE | 210-222B | Normal Operation Mode |

FIG. 3

COMMUNICATION CONFIGURATION DEVICE

BACKGROUND OF THE INVENTION

Technical Field

The present invention relates to a communication configuration device.

Background Art

Wireless communication systems constituted by a plurality of wireless nodes and a configuration terminal which configures the frequencies and the like used by those wireless nodes, for example, are well-known (see Patent Document 1, for example).

RELATED ART DOCUMENT

Patent Document

Patent Document 1: Japanese Patent Application Laid-Open Publication No. 2008-228191

In the wireless communication system according to Patent Document 1, when setting or changing initial settings for the wireless nodes, the system is switched to a prescribed initialization channel between the wireless nodes and the configuration terminal, and setting values are sent from the configuration terminal to the wireless nodes. In other words, when initializing the wireless nodes, the wireless nodes are reset to a prescribed initial channel. Once the wireless nodes are in this reset state, the configuration terminal synchronizes with the wireless nodes to send setting values for a normal operation channel thereto. This changes the configuration of the wireless nodes from using the initial channel to using the normal operation channel. The wireless nodes thus configured to use the normal operation channel then communicate with associated access points to control devices to be controlled.

However, in the wireless communication system according to Patent Document 1 as described above, when changing the channel setting values for the wireless nodes, the wireless nodes have to be manually restarted and cannot be configured in a completely automatic manner via wireless communications, which can potentially increase the amount of work required.

SUMMARY OF THE INVENTION

Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides: a communication configuration device installed in at least one of a plurality of communication terminals that are designed to be connected in a manner to establish a wireless network, the communication configuration device including: a network interface; one or more processors connected to the network interface; and a storage unit connected to the one or more processors, storing first setting information providing communication settings for all of the plurality of communication terminals in the wireless network, wherein the one or more processors perform the following: receiving, through the network interface, second setting information providing communication settings for all of the plurality of communication terminals; evaluating the second setting information to determine if the second setting information indicates that one or more of settings of the communication terminal in which the communication configuration device is installed need to be changed; and if the second setting information indicates that one or more of the settings of the communication terminal in which the communication configuration device is installed need to be changed, causing a corresponding setting in the first setting information stored in the storage unit to be replaced with an updated setting indicated in the second setting information so that the updated setting is applied to the communication terminal.

In another aspect, the present disclosure provides a method of configuring communications performed by one or more processors in a communication configuration device installed in at least one of a plurality of communication terminals that are designed to be connected in a manner to establish a wireless network, the communication configuration device including: a network interface; the one or more processors connected to the network interface; and a storage unit connected to the one or more processors, storing first setting information providing communication settings for all of the plurality of communication terminals in the wireless network, the method including causing the one or more of the processors to perform the following: receiving, through the network interface, second setting information providing communication settings for all of the plurality of communication terminals; evaluating the second setting information to determine if the second setting information indicates that one or more of settings of the communication terminal in which the communication configuration device is installed need to be changed; and if the second setting information indicates that one or more of the settings of the communication terminal in which the communication configuration device is installed need to be changed, causing a corresponding setting in the first setting information stored in the storage unit to be replaced with an updated setting indicated in the second setting information so that the updated setting is applied to the communication terminal.

Other aspects of the present invention will become clear from the attached drawings and the descriptions in the present specification.

According to the present disclosure, by sending desired setting information from a configuration device to nodes via wireless communications, setting information on the nodes can be overwritten without restarting the nodes, thereby eliminating the need to restart the nodes manually and making it possible to reduce the amount of work required.

It is to be understood that both the foregoing general description and the following detailed description are exemplary and explanatory, and are intended to provide further explanation of the invention as claimed.

BRIEF DESCRIPTION OF THE DRAWINGS

FIG. 3 illustrates an example of a setting information table according to the embodiment.

DETAILED DESCRIPTION OF EMBODIMENTS

Figure 1:
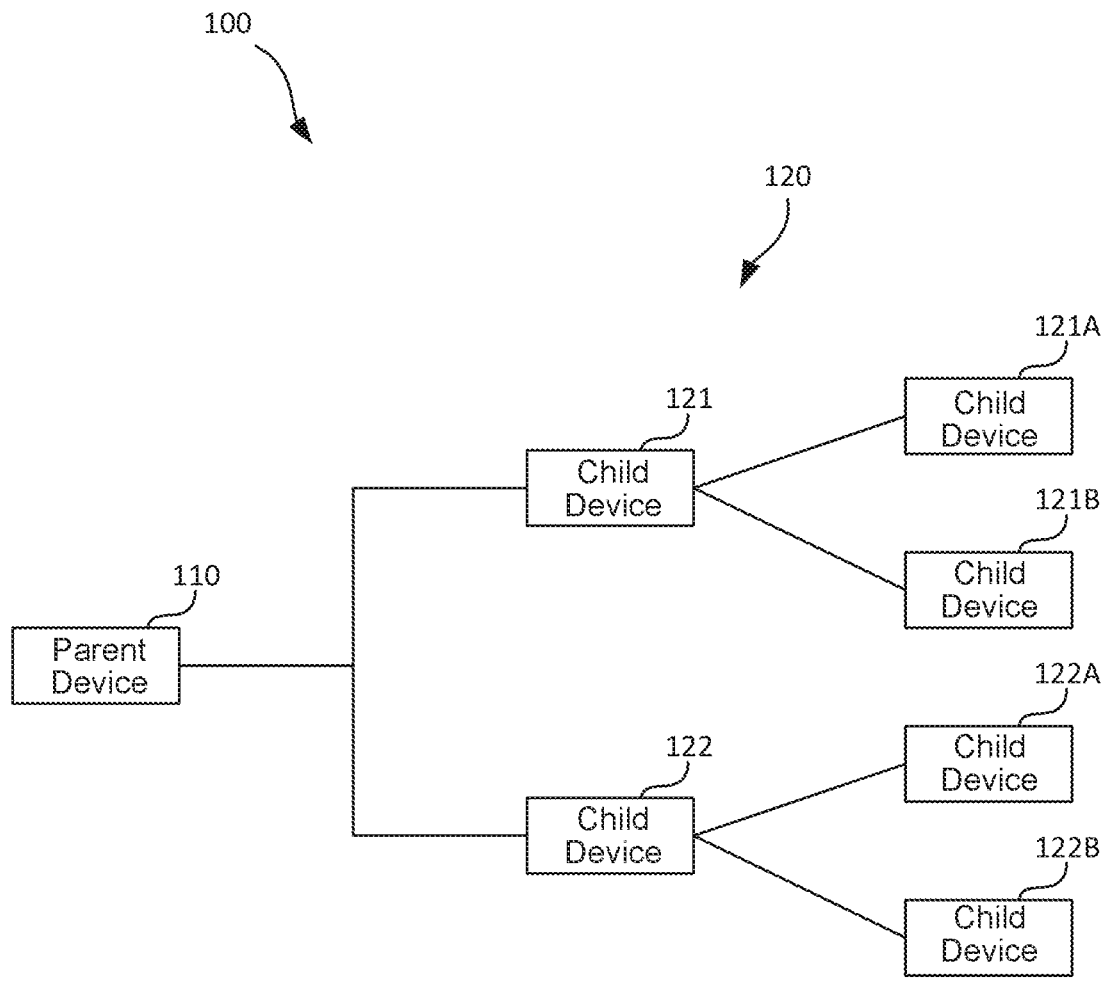
FIG. 1 is a network diagram illustrating an example arrangement of communication terminals on a communication network according to an embodiment.

The present specification and descriptions of the attached drawings will make at least the following clear. Note that FIGS. 1 to 4 will be described using the same reference characters for components which are the same.

Communication Configuration Device 10

Next, a communication network 100 to which a communication configuration device 10 is applied will be described with reference to FIG. 1. FIG. 1 is a network diagram illustrating an example arrangement of communication terminals on the communication network 100 according to the present embodiment. Note that although in FIG. 1 the communication terminals are illustrated as being connected via solid lines for simplicity, in reality these communication terminals are connected wirelessly.

As illustrated in FIG. 1, the communication network 100 includes a communication terminal (hereinafter, a "parent device 110") which broadcasts beacon information and communication terminals (hereinafter, "child devices 120") which communicate with the parent device 110 or other communication terminals wirelessly. The child devices 120 include child devices 121 and 122 as well as child devices 121A, 121B, 122A, and 122B which are respectively connected thereto, for example. The parent device 110 and the child devices 120 are communication devices equipped in monitoring equipment for monitoring a solar power generation system on a per-string basis, for example. In the communication network 100, the parent device 110 transmits beacon information to the child devices 121 and 122, and the child devices 121 and 122 then transmit that beacon information to the respectively connected child devices 121A and 121B, and 122A and 122B. This makes it possible to propagate the beacon information transmitted by the parent device 110 to all of the child devices 120 on the communication network 100. Here, the beacon information is information including beacon signals and second setting information included therein (described later).

Configuration of Communication Configuration Device 10

Figure 2:
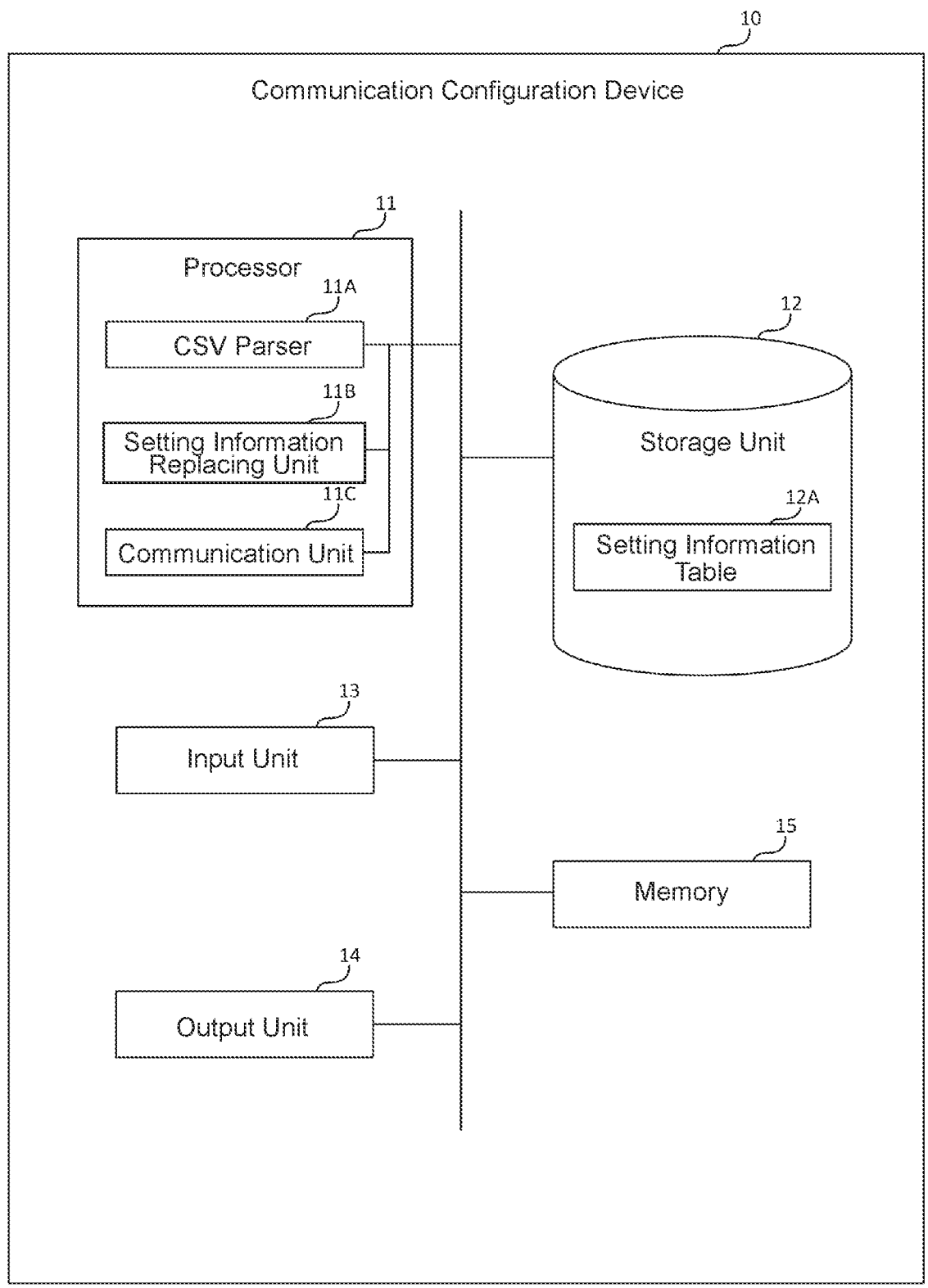
FIG. 2 is a block diagram illustrating an example configuration of a communication configuration device according to the embodiment.

Next, a configuration of the communication configuration device 10 will be described with reference to FIGS. 2 and 3. FIG. 2 is a block diagram illustrating an example configuration of the communication configuration device 10 according to the present embodiment. FIG. 3 illustrates an example of a setting information table 12A according to the present embodiment.

The communication configuration device 10 is a device connected to the parent device 110 and the child devices 120 in a manner enabling communication therebetween, for example. However, the communication configuration device 10 is not limited in terms of whether configured to be installed within the parent device 110 and the child devices 120 or configured as a separate device that can communicate with each of the parent device 110 and the child devices 120. Although the following description assumes a case in which the communication configuration device 10 is installed within the child devices 120, the following description applies equally to a case in which the communication configuration device 10 is installed within the parent device 110. Similarly, although the following description describes beacon information transmitted from the parent device 110 and received by the child devices 120, the following description applies equally to beacon information transmitted from the parent device 110 and received by the downstream child devices 120 via the upstream child devices 120.

The communication configuration device 10 has a feature for replacing information related to settings for the child devices 120 on the basis of the beacon information transmitted from the parent device 110. In other words, the communication configuration device 10 can replace setting information (hereinafter, "first setting information") currently being used by the child devices 120 with new setting information (hereinafter, "second setting information") transmitted from the parent device 110, thereby making it possible to change the settings of the child devices 120 without having to manually start the child devices 120 in configuration mode before proceeding with further work. Moreover, when newly constructing the communication network 100 with the parent device 110 and the child devices 120, the communication configuration device 10 inputs the second setting information to the parent device 110, so that the second setting information is transmitted to the child devices 120, thereby making it possible to configure the child devices 120 automatically.

The first setting information and the second setting information are information including frequency information indicating radio frequency channels for the child devices 120, address information indicating the MAC addresses of the child devices 120, positional information indicating the installation positions of the child devices 120, and mode information indicating the operation modes of the child devices 120. More specifically, the frequency information is information representing frequency channels for radio waves transmitted and received between the child devices 120 and the parent device 110 or other child devices 120. When using IEEE 802.15.4, for example, the frequency channels are 16 channels. The parent device 110 and the child devices 120 are set to the same frequency channel. The address information is information for identifying the child devices 120. Referencing this address information allows the communication configuration device 10 to identify the child devices 120 for which to replace the first setting information with the second setting information. The positional information is information indicating string number in a solar power generation system or information indicating latitude and longitude, for example. The mode information is information indicating the operation modes of the child devices 120, which are modes such as normal operation mode, scanning mode, and configuration mode, for example.

As illustrated in FIG. 2, the communication configuration device 10 having this type of feature includes a processor 11, a storage unit 12, an input unit 13, an output unit 14, and a memory 15.

The processor 11 is constituted by a CPU, an MPU, or the like, for example. The processor 11 achieves various functionalities by reading programs stored in the memory 15. The processor 11 includes a CSV parser 11A, a setting information replacing unit 11B, and a communication unit 11C. Although these elements are named as if they are separate physical units, actually, these elements 11A to 11C are processes performed by the processor 11, which may be constructed by one or more processors, by receiving data representing corresponding information or signals.

The CSV parser 11A has a feature for reading CSV-formatted second setting information input from the input unit 13. This makes it possible to exchange CSV data in a generally-used CSV format, thereby simplifying communication processes.

The setting information replacing unit 11B has features for outputting the second setting information (which is read as CSV data) to the storage unit 12 and changing the settings of the child device 120 to which the communication configuration device 10 is connected. More specifically, the setting information replacing unit 11B can replace first setting information stored on a storage device (not illustrated in the figure) in the child device 120 with second setting information sent from the parent device 110. Thus, sending the second setting information from the parent device 110 to the child device 120 makes it possible to automatically update the first setting information on the child device 120 with the second setting information.

Note that although it is described here that the setting information replacing unit 11B replaces the first setting information stored on the storage device (not illustrated in the figure) in the child device 120 with the second setting information, alternatively, a processing device (not illustrated in the figure) in the child device 120 may read second setting information from the storage unit 12 to thereby replace the first setting information stored on the storage device (not illustrated in the figure) in the child device 120 with the second setting information. In other words, the setting information replacing unit 11B may replace the first setting information on the storage device (not illustrated in the figure) in the child device 120 with the second setting information directly, or the setting information replacing unit 11B may replace the first setting information in the storage unit 12 with the second setting information so that the first setting information on the child device 120 can then be replaced with the second setting information.

In addition, the setting information replacing unit 11B also has a feature for determining whether the MAC address of a given child device 120 is included within the address information in the input second setting information. Upon determining that the MAC address of a given child device 120 is included within the address information in the second setting information, the setting information replacing unit 11B replaces the first setting information stored in the storage unit 12 with the second setting information. In other words, when a given child device 120 joins the communication network 100, it is possible to identify that child device 120 by MAC address and to automatically change the settings of that child device 120.

The communication unit 11C has a feature for allowing the parent device 110 and the child devices 120 to perform multi-hop communication. Thus, when forming a multi-hop network with the parent device 110 and the child devices 120, communication paths can be stably formed in accordance with changes in the configuration of the communication network 100.

Furthermore, the communication unit 11C also has a feature for determining whether communications between the parent device 110 and the child devices 120 are disrupted. When communications are not possible for a prescribed period of time, the communication unit 11C changes the state of the child device 120 from the current operation mode to another operation mode. This makes it possible for the parent device 110 or the child devices 120 to re-search for communication partners, thereby making it possible to avoid communication delays.

The storage unit 12 is a device which stores programs and various types of information. The storage unit 12 is constituted by ROM, RAM, flash memory, or the like, for example. The storage unit 12 stores the setting information table 12A, for example. The setting information table 12A stores various types of information associated with the child devices 120 forming the communication network 100. The setting information table 12A includes the following fields: a "Parent ID" field indicating the parent device 110 broadcasting beacon information, a "Child ID" field indicating the child devices 120 receiving that beacon information, a "Frequency Information" field indicating frequency channels for the child devices 120, an "Address Information" field indicating the individual MAC addresses of the child devices 120, a "Positional Information" field indicating the physical positions of the child devices 120, and a "Mode Information" field indicating the operation modes of the child devices 120. More specifically, here the frequency information is set to "2", for example, as the same frequency channel for the parent device 110 and the child devices 120. The address information is set to 48-bit MAC addresses assigned when the child devices 120 are manufactured. The positional information is set to string numbers in a solar power generation system in which the child devices 120 are arranged. The mode information is set to the operation modes of the child devices 120. Information related to the settings of the parent device 110 and all of the child devices 120 forming the communication network 100 is stored in this manner.

The input unit 13 is a network interface to which information from the communication terminal connected to the communication configuration device 10 is input. The output unit 14 is a network interface which outputs information to the communication terminal connected to the communication configuration device 10. The memory 15 is a device which stores programs to be executed by the processor 11. The memory 15 is constituted by a hard disk drive, an SSD, an optical storage device, or the like.

Configuration Procedure of Communication Configuration Device 10

Figure 4:
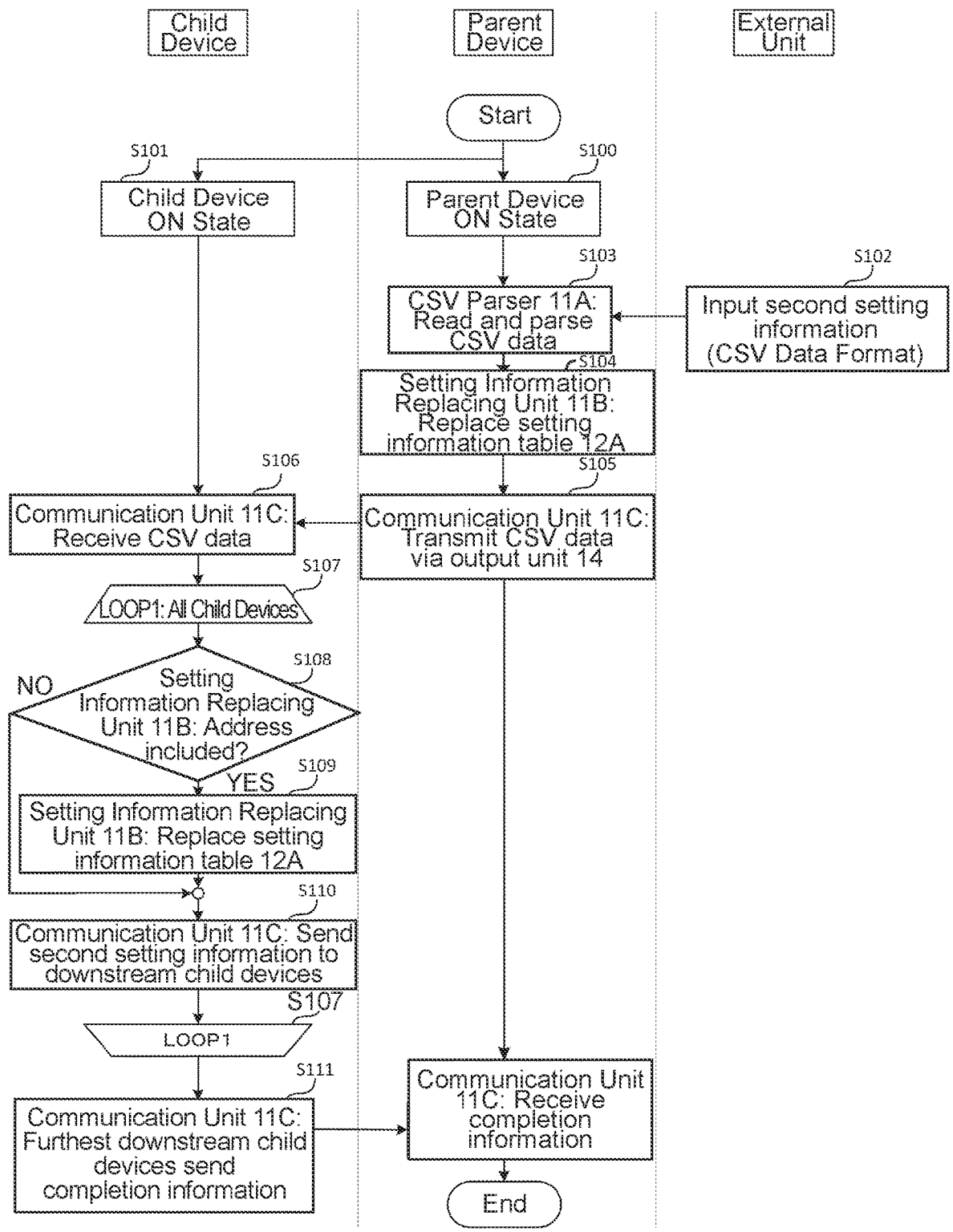
FIG. 4 is a flowchart illustrating an example of a configuration procedure of the communication configuration device according to the embodiment.

Next, a configuration procedure of the communication configuration device 10 will be described with reference to FIGS. 1 and 4. FIG. 4 is a flowchart illustrating an example of the configuration procedure of the communication configuration device 10 according to the present embodiment. The configuration procedure illustrated in FIG. 4 is implemented in the form of execution of various programs by the processor 11 of the communication configuration device 10.

First, the procedure verifies that the parent device 110 and the child devices 120 on the communication network 100 are in a powered ON state (S100, S101). CSV data including second setting information is then input to the parent device 110 from an external unit (S102). The second setting information is information which is input when the structure of the child devices 120 on the communication network 100 changes, for example. The CSV data input via the input unit 13 is read by the CSV parser 11A and then passed to the setting information replacing unit 11B as second setting information (S103). The setting information replacing unit 11B then replaces first setting information in the setting information table 12A in the storage unit 12 with the passed second setting information (S104). The communication unit 11C sets the second setting information as beacon information and transmits that beacon information via the output unit 14 to the child devices 120 using multi-hop communications (S105). In this way, the parent device 110 can broadcast beacon information including CSV data to the child devices 120 using multi-hop communications.

Next, the child devices 120 utilize the communication units 11C to receive the beacon information including CSV data (S106). The child devices 120 that receive this beacon information from the parent device 110 are child devices 120 which are arranged at a distance allowing direct communication with the parent device 110, and are shown as the child devices 121 and 122 illustrated in FIG. 1, for example. The remainder of the procedure will be described using the communication network 100 illustrated in FIG. 1 as an example.

In the child device 121, which has received the CSV data, the setting information replacing unit 11B determines whether the MAC address of the child device 121 is included in the address information in the CSV data (S108). If it is determined that the MAC address of the child device 121 is included (YES in S108), the first setting information stored in the storage unit 12 is replaced with the second setting information (S109). This updates the settings of the child device 121. If it is determined that the MAC address of the child device 121 is not included (NO in S108), or once S109 has been completed, the procedure proceeds to S110.

Next, using a multi-hop, the communication unit 11C transmits beacon information including CSV data via the output unit 14 to the child devices 121A and 121B arranged downstream of the child device 121 (S110). In the child devices 121A and 121B, the respective communication units 11C receive the beacon information including the CSV data via the respective input units 13 and then transmit completion information indicating that receipt is complete back to the parent device 110 via the multi-hop network (S111). Upon receiving this completion information, the parent device 110 ends the procedure (S112).

Note that the child devices 122, 122A, and 122B operate in the same manner as the child devices 121, 121A, and 121B described above and therefore will not be described here. Moreover, although this is not illustrated in FIG. 4, if any of the child devices 120 do not successfully receive the beacon information within a prescribed period of time, the respective communication unit 11C changes the operation mode, and that child device 120 re-searches for the other child devices 120 that are available for communication.

The embodiment described above was presented only to facilitate understanding of the present invention and should not be interpreted to limit the present invention in any way. The present invention can be modified and improved within the spirit of the invention, and such equivalent configurations are also included within the present invention. For example, the configurations described below are also included.

Other Embodiments

Although the embodiment above described the parent device 110 and the child devices 120 sending and receiving beacon information, the present invention is not limited to this configuration. For example, beacon information does not necessarily need to be used, and any bidirectional wireless communication technology may be used, such as specified low-power radio equipment, for example.

Although in the embodiment above the parent device 110 and the child devices 120 were described as being communication devices equipped in monitoring equipment for monitoring a solar power generation system on a per-string basis, for example, the present invention is not limited to this configuration. For example, the parent device 110 and the child devices 120 may be communication devices used in heavy equipment, animal watching sensors and the like which utilize multi-hop communications.

Although in the embodiment above the communication configuration device 10 was described as being installed in the parent device 110 and the child devices 120, the present invention is not limited to this configuration. This is because as long as the communication configuration device 10 is installed in at least the child device 120, information related to settings output from the parent device 110 can still be processed.

Although the first setting information and the second setting information were described as including frequency information in the embodiment above, the present invention is not limited to this configuration. For example, a configuration in which frequency information is not included may be used, in which case the frequencies should be matched using features of the parent device 110 and the child devices 120.

Although the first setting information and the second setting information were described as including address information in the embodiment above, the present invention is not limited to this configuration. For example, a configuration in which address information is not included may be used, in which case the child devices 120 should be identified using the positional information.

Although the first setting information and the second setting information were described as including positional information in the embodiment above, the present invention is not limited to this configuration. For example, a configuration in which positional information is not included may be used, in which case the child devices 120 should be identified using the address information.

Although the first setting information and the second setting information were described as being CSV data in the embodiment above, the present invention is not limited to this configuration. The first setting information and the second setting information do not necessarily need to be CSV data and may be in any commonly used data format, for example.

Although the processor 11 was described as including the communication unit 11C in the embodiment above, the present invention is not limited to this configuration. For example, a configuration in which the communication unit 11C is not included may be used. In this case, it is not determined whether communications between the parent device 110 and the child devices 120 are disrupted.

SUMMARY

As described above, the communication configuration device 10 according to the present embodiments includes: the storage unit 12 storing first setting information and second setting information for the parent device 110 and the child devices 120 which are connected in a manner enabling communications therebetween so as to form the communication network 100; and the setting information replacing unit 11B which, when second setting information for the parent device 110 and the child devices 120 which is different from the first setting information is communicated between each of the parent device 110 and the child devices 120, replaces the first setting information stored in the storage unit 12 with the second setting information. The present embodiment makes it possible to automatically update information related to the settings of the parent device 110 and the child devices 120, thereby eliminating the need to manually restart the child devices 120 and making it possible to improve work efficiency.

Moreover, the communication configuration device 10 according to the present embodiments further includes the communication unit 11C for enabling each of the parent device 110 and the child devices 120 to communicate using beacons. The present embodiment thus makes it possible to construct the communication network 100 at low cost.

Furthermore, in the communication configuration device 10 according to the present embodiments, the first setting information and the second setting information include frequency information set to each of the parent device 110 and the child devices 120, and the setting information replacing unit 11B replaces the first setting information stored in the storage unit 12 with the second setting information so as to set the parent device 110 and the child devices 120 to have a radio frequency indicated by the second setting information. The present embodiment thus makes it possible to easily match the frequency channels of each of the parent device 110 and the child devices 120.

In addition, in the communication configuration device 10 according to the present embodiment, the first setting information and the second setting information include address information indicating MAC addresses set to each of the parent device 110 and the child devices 120, and the setting information replacing unit 11B determines whether the child devices 120 have MAC addresses indicated by the address information, and, upon determining that the child devices 120 have such MAC addresses, replaces the first setting information stored in the storage unit 12 with the second setting information. The present embodiment makes it possible to easily identify the child devices 120 for which to overwrite settings-related information, thereby making it possible to reduce processing time.

Moreover, in the communication configuration device 10 according to the present embodiment, the first setting information and the second setting information include positional information indicating installation positions of the parent device 110 and the child devices 120, and the setting information replacing unit 11B replaces the first setting information stored in the storage unit 12 with the second setting information so as to set the positional information to installation positions indicated by the second setting information. The present embodiment makes it possible to ascertain the physical positioning of the parent device 110 and the child devices 120, thereby making it possible to improve work efficiency.

Furthermore, in the communication configuration device 10 according to the present embodiment, the first setting information and the second setting information include mode information indicating operation modes of the parent device 110 and the child devices 120, and the setting information replacing unit 11B replaces the first setting information stored in the storage unit 12 with the second setting information so as to set the parent device 110 and the child devices 120 to operation modes indicated by the mode information. The present embodiment makes it possible to easily change the operation modes of the parent device 110 and the child devices 120, thereby making it possible to improve work efficiency.

In addition, in the communication configuration device 10 according to the present embodiment, the communication unit 11C determines whether communications are disrupted between each of the parent device 110 and the child devices 120, and, when communication is not possible for a prescribed period of time, changes the child devices 120 from an operation mode corresponding to the mode information to a different operation mode. The present embodiment makes it possible to exclude the child devices 120 that cannot communicate, thereby making it possible to create the communication network 100 quickly.

Moreover, in the communication configuration device 10 according to the present embodiment, the first setting information and the second setting information are CSV data. The present embodiment utilizes a general-purpose data format, thereby making it possible to improve the efficiency of communication processes.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A communication configuration device installed in at least one of a plurality of communication terminals that are designed to be connected in a manner to establish a wireless network, the communication configuration device comprising:
    a network interface;
    one or more processors connected to the network interface; and
    a storage unit connected to said one or more processors, storing first setting information providing communication settings for all of the plurality of communication terminals in the wireless network, the communication terminal in which the communication configuration device is installed being configured in accordance with the first setting information stored in the storage unit,
    wherein said one or more processors perform the following:
        receiving, through the network interface, second setting information providing communication settings for all of the plurality of communication terminals;
        evaluating the second setting information to determine if the second setting information indicates that the first setting information concerning the communication terminal in which the communication configuration device is installed needs to be changed; and
        if the second setting information indicates that the first setting information concerning the communication terminal in which the communication configuration device is installed needs to be changed, causing a corresponding setting in the first setting information stored in the storage unit to be replaced with an updated setting indicated in the second setting information to update the first setting information stored in the storage unit so that the updated setting is applied to said communication terminal.

2. The communication configuration device according to claim 1, wherein said one or more processors receives, through the network interface, the second setting information in the form of beacon signal that is broadcasted from a communication terminal placed upstream in the wireless network.

3. The communication configuration device according to claim 2,
    wherein one of the communication settings set by the first setting information and updated by the second setting information is radio frequency information indicating a radio frequency with which each of the plurality of communication terminals communicates in the wireless network.

4. The communication configuration device according to claim 2,
wherein the first setting information and the second setting information include MAC address information indicating a MAC address of each of the plurality of communication terminals for which at least one of settings needs to be changed, and
wherein in evaluating the second setting information, said one or more processors determine whether a MAC address of the communication terminals in which the communication configuration device is installed is one of the MAC addresses indicated in the MAC address information, and if so, updates the corresponding setting based on the second setting information.

5. The communication configuration device according to claim 4,
wherein one of the communication settings set by the first setting information and updated by the second setting information is operation mode information indicating an operation mode of each of the plurality of communication terminals.

6. The communication configuration device according to claim 5, wherein said one or more processors determine, through the network interface, whether communications are disrupted between the communication terminal in which the communication configuration device is installed and any of other communication terminals in the wireless network, and if communication to any one of the other communication terminals is not successful for a prescribed period of time, said one or more processors update the operation mode of the corresponding communication terminal stored in the storage unit to indicate the communication failure.

7. The communication configuration device according to claim 2,
wherein one of the communication settings set by the first setting information and updated by the second setting information is location information indicating a location of each of the plurality of communication terminals.

8. The communication configuration device according to claim 2,
wherein one of the communication settings set by the first setting information and updated by the second setting information is operation mode information indicating an operation mode of each of the plurality of communication terminals.

9. The communication configuration device according to claim 8, wherein said one or more processors determine, through the network interface, whether communications are disrupted between the communication terminal in which the communication configuration device is installed and any of other communication terminals in the wireless network, and if communication to any one of the other communication terminals is not successful for a prescribed period of time, said one or more processors update the operation mode of the corresponding communication terminal stored in the storage unit to indicate the communication failure.

10. The communication configuration device according to claim 1,
wherein one of the communication settings set by the first setting information and updated by the second setting information is radio frequency information indicating a radio frequency with which each of the plurality of communication terminals communicates in the wireless network.

11. The communication configuration device according to claim 1,
wherein the first setting information and the second setting information include MAC address information indicating a MAC address of each of the plurality of communication terminals for which at least one of settings needs to be changed, and
wherein in evaluating the second setting information, said one or more processors determine whether a MAC address of the communication terminals in which the communication configuration device is installed is one of the MAC addresses indicated in the MAC address information, and if so, updates the corresponding setting based on the second setting information.

12. The communication configuration device according to claim 11,
wherein one of the communication settings set by the first setting information and updated by the second setting information is location information indicating a location of each of the plurality of communication terminals.

13. The communication configuration device according to claim 11,
wherein one of the communication settings set by the first setting information and updated by the second setting information is operation mode information indicating an operation mode of each of the plurality of communication terminals.

14. The communication configuration device according to claim 13, wherein said one or more processors determine, through the network interface, whether communications are disrupted between the communication terminal in which the communication configuration device is installed and any of other communication terminals in the wireless network, and if communication to any one of the other communication terminals is not successful for a prescribed period of time, said one or more processors update the operation mode of the corresponding communication terminal stored in the storage unit to indicate the communication failure.

15. The communication configuration device according to claim 1,
wherein one of the communication settings set by the first setting information and updated by the second setting information is location information indicating a location of each of the plurality of communication terminals.

16. The communication configuration device according to claim 1,
wherein one of the communication settings set by the first setting information and updated by the second setting information is operation mode information indicating an operation mode of each of the plurality of communication terminals.

17. The communication configuration device according to claim 16, wherein said one or more processors determine, through the network interface, whether communications are disrupted between the communication terminal in which the communication configuration device is installed and any of other communication terminals in the wireless network, and if communication to any one of the other communication terminals is not successful for a prescribed period of time, said one or more processors update the operation mode of the corresponding communication terminal stored in the storage unit to indicate the communication failure.

18. The communication configuration device according to claim 1, wherein the first setting information and the second setting information are formatted in a CSV (comma separated values) format.

19. The communication configuration device according to claim 1, wherein the communication terminals are included in any one of networks of monitoring devices for monitoring a solar power generation system, heavy apparatuses that communicate via multi-hop communication scheme, and animal watching sensors.

20. A method of configuring communications performed by one or more processors in a communication configuration device installed in at least one of a plurality of communication terminals that are designed to be connected in a manner to establish a wireless network, the communication configuration device including: a network interface; said one or more processors connected to the network interface; and a storage unit connected to said one or more processors, storing first setting information providing communication settings for all of the plurality of communication terminals in the wireless network, the communication terminal in which the communication configuration device is installed being configured in accordance with the first setting information stored in the storage unit, the method comprising causing said one or more of the processors to perform the following:
  receiving, through the network interface, second setting information providing communication settings for all of the plurality of communication terminals;
  evaluating the second setting information to determine if the second setting information indicates that the first setting information concerning the communication terminal in which the communication configuration device is installed needs to be changed; and
  if the second setting information indicates that the first setting information concerning the communication terminal in which the communication configuration device is installed needs to be changed, causing a corresponding setting in the first setting information stored in the storage unit to be replaced with an updated setting indicated in the second setting information to update the first setting information stored in the storage unit so that the updated setting is applied to said communication terminal.

\* \* \* \* \*